Oct. 16, 1951     H. M. PURCELL     2,571,758
FLUID OPERABLE DEVICE
Filed March 23, 1946     2 SHEETS—SHEET 1
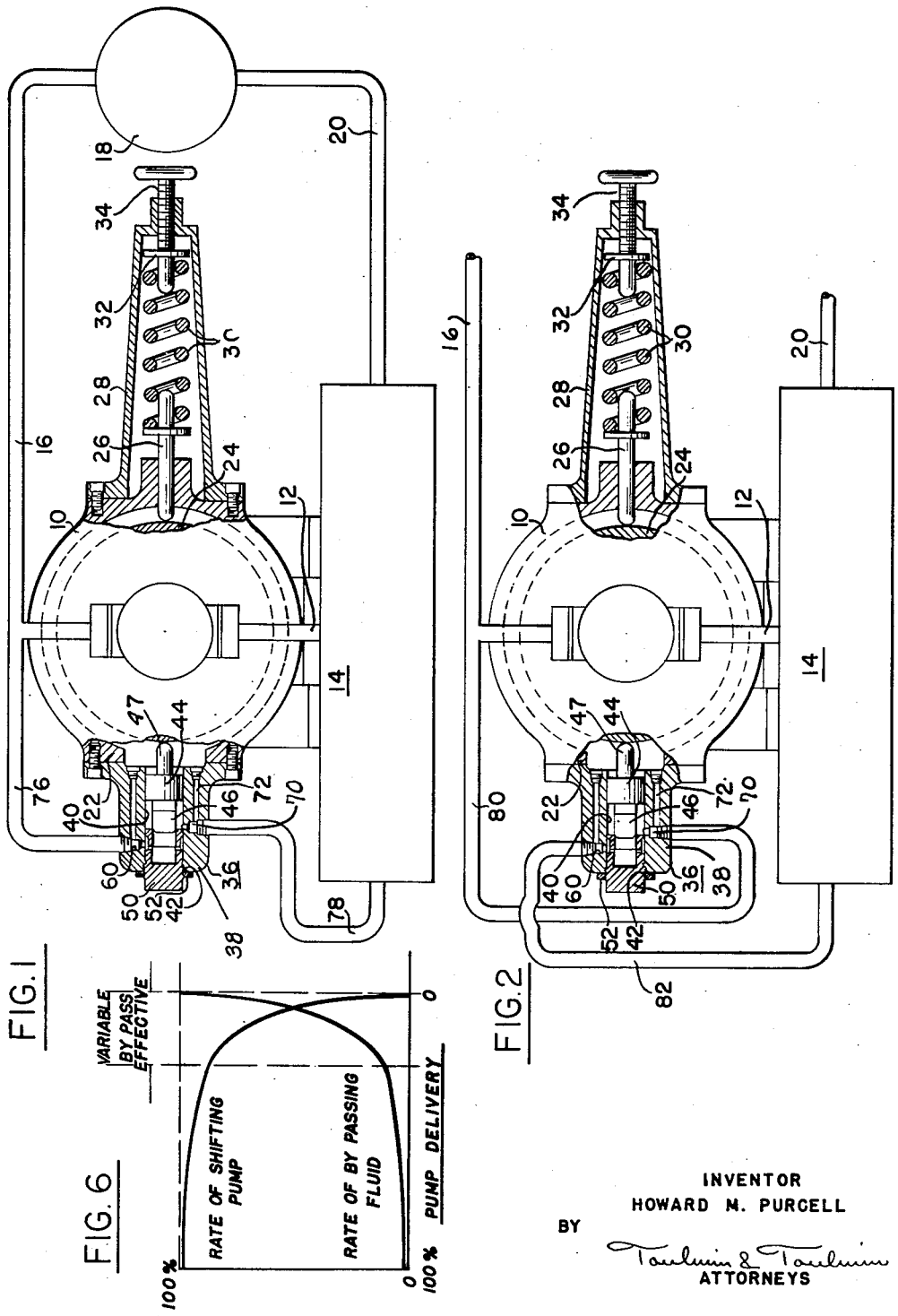
INVENTOR
HOWARD M. PURCELL
BY
ATTORNEYS Oct. 16, 1951     H. M. PURCELL     2,571,758
FLUID OPERABLE DEVICE
Filed March 23, 1946     2 SHEETS—SHEET 2
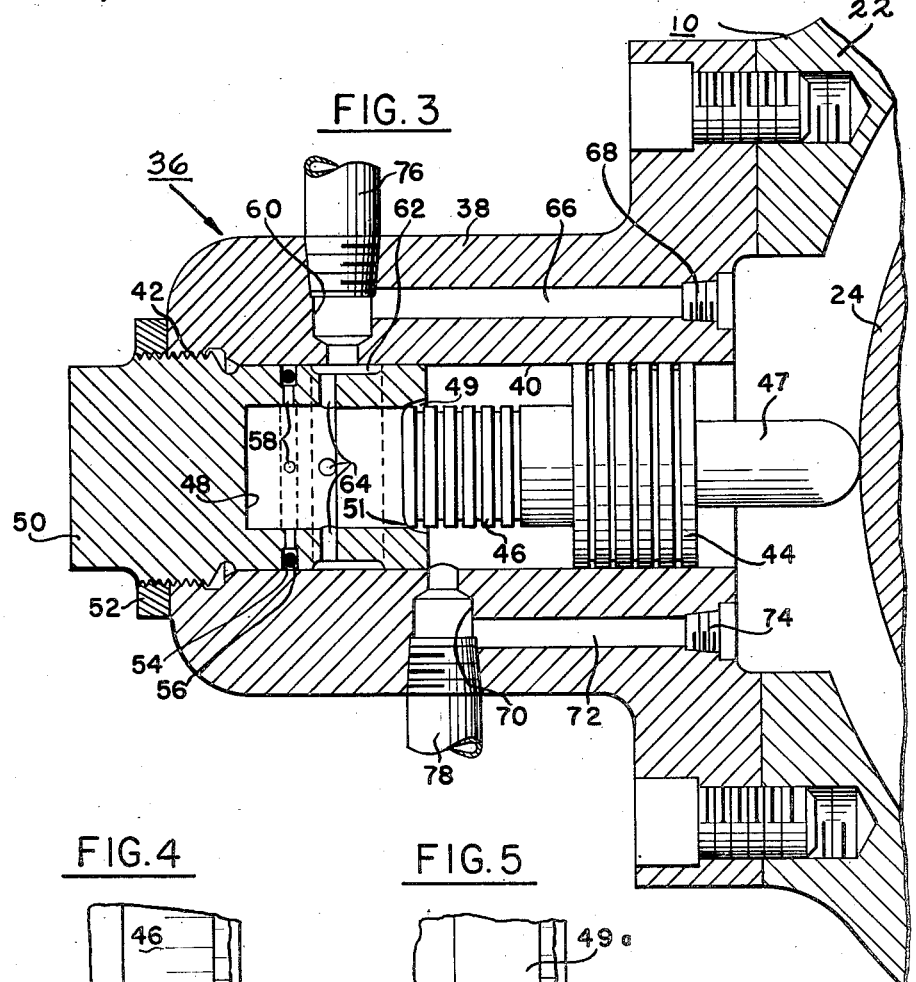
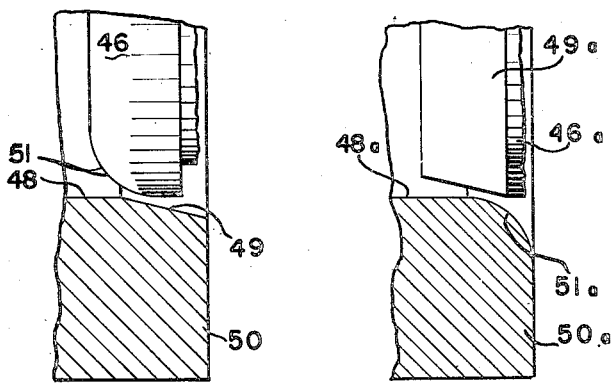
INVENTOR
HOWARD M. PURCELL
BY
ATTORNEYS Patented Oct. 16, 1951

2,571,758

UNITED STATES PATENT OFFICE 2,571,758

FLUID OPERABLE DEVICE

Howard M. Purcell, Mount Gilead, Ohio, assignor to H-P-M Development Corporation, Wilmington, Del., a corporation of Delaware Application March 23, 1946, Serial No. 656,613

4 Claims. (Cl. 103—38)

This invention relates to fluid operable apparatus and particularly to fluid pumps and control devices therefor. More particularly still, this invention relates to a control device for use in connection with a variable delivery pump.

The particular object of this invention is to provide an improved device for use in connection with a variable delivery pump which will center the pump under a predetermined pressure.

In the usual type of variable delivery pump, and especially in the case of radial piston pumps, there is a tendency for the movable flow control member of the pump to hunt or wobble about its neutral position when the pump is holding pressure at substantially no delivery. In many machine operations, press work and hydraulic systems it is desired, during a portion of a work cycle, to hold pressure in the system without any substantial amount of fluid being supplied thereto. While this can sometimes be accomplished by a relief valve, there is a loss of energy in connection with such a system which is wasteful and undesirable. Accordingly, it is preferred to employ a variable delivery pump whenever possible in order to obtain an efficient and flexible system.

However, as pointed out above, pumps of this type have a tendency to hunt across their neutral position and to generate variable pressures in the fed circuit. The exact cause of this hunting is not known but it is at least partly caused by static friction in the movable parts of the pump. Another probable cause of the hunting is that as the pump moves toward neutral under the action of its centering device it displaces fluid from the pumping chambers. This displaced fluid in turn acts on the control device and shifts the pump beyond neutral whereupon the pump goes on reverse stroke and withdraws fluid from the control device.

It has been found that a control device according to this invention substantially eliminates hunting under all conditions of pump operation. This is accomplished by providing a bypass of the high pressure fluid control device which is rapidly variable at the neutral position of the pump. Also, the exact position of the bypass is adjustable in order to compensate for pumps and circuits having different characteristics.

Another object of this invention, therefore, is the provision of a pressure holding device for a variable delivery pump which is adjustable to compensate for pumps having different characteristics.

Still another object is to provide a control device for a variable delivery pump which is adjustable to compensate for variables in the hydraulic circuit being fed.

Still another object is the provision of a pressure control device for a variable delivery pump which is inexpensive to machine and build and which has improved operating characteristics. It is also an object to provide a pressure holding device for a variable delivery pump which is operable by a plurality of pressures.

These and other objects and advantages become more apparent upon reference to the following specification taken together with the accompanying drawings in which:

Figure 1 is a view showing a pump having a control device according to this invention and connected for high pressure operation;

Figure 2 is a view similar to Figure 1 but showing the control device connected for low pressure operation;

Figure 3 is an enlarged sectional view of the control device of this invention showing the construction and adjustments thereof more clearly;

Figure 4 is an enlarged fragmentary view showing more in detail the bevelled bypass;

Figure 5 is a view of a modified construction wherein the bevelled portion is associated with the piston rather than the cylinder; and Figure 6 is a graph illustrating the operation of this invention.

Referring to the drawings and in particular to Figures 1 to 3, there is illustrated a pump 10 which has a suction line 12 connected to a reservoir 14 and a discharge line 16. The discharge line 16 may be connected into any type hydraulic circuit but is illustrated in the drawing as supplying fluid to the inlet of a motor 18 whose outlet is connected by a conduit 20 with the reservoir for completing the circuit.

The pump 10 is a variable delivery pump having a casing 22 within which is movable a shift ring or flow controlling member 24. The flow controlling member 24 is continuously urged leftwardly toward its full stroke position by a plunger 26 which extends through the wall of the casing 22.

Secured to the casing 22 to receive the plunger 26 is an elongated casing 28 which houses the spring 30. The spring 30 bears between the end of the plunger 26 and a plate 32 carried on the end of a screw 34 which is adjustable in the casing 28. By manipulating the screw 34, any predetermined amount of thrust may be exerted on the plunger 26 within the limits of the spring 30.

Secured to the opposite side of the casing 22 is the control device of this invention, generally indicated by the reference numeral 36. The control device comprises a flanged cylinder 38 having a bore 40 therethrough which terminates in the internally threaded portion 42.

Reciprocable within the cylinder 40 is a piston comprising the larger portion 44 and the smaller portion 46. The larger portion 44 has connected therewith or is abutted by a plunger 47 which extends through the casing wall to be connected with or to abut the shift ring 24.

The smaller piston 46 is adapted for being received within the bore 48 in a plug 50 that is threaded into the portion 42 of the cylinder 38. A nut 52 locks the plug 50 in any particular position of adjustment and an annular groove 54 receives the rubber-like packing ring 56 which prevents leaking of fluid from within the cylinder 38 to the outside thereof around the plug 50. There may be the radial drills 58 communicating the bore 48 with the groove 54 in order to press the ring 56 outwardly if desired.

The cylinder 38 has a port 60 which is in communication with the peripheral groove 62 in the plug 50. The peripheral groove in turn communicates with the bore 48 through the radial pasages 64. The port 60 is also intersected by a passage 66 which leads toward the pump casing to a port 68.

The cylinder 38 also has a port 70 which communicates with the bore 40 beyond the end of the plug 50. The port 70 is also intersected with a passage 72 which leads toward the pump casing 22 and terminates in a port 74.

In operation, high pressure operation of the pump may be had by connecting the port 60 by a conduit 76 with the discharge conduit 16 of the pump. At this time, the port 70 is connected by a conduit 78 with the reservoir 14. The port 68 is plugged and the port 74 may be plugged or left open as desired. This manner of connecting the control device is illustrated in Figure 1.

In Figure 1, when the pump discharge pressure reaches the value which will compress the spring 30, the pistons 46 and 44, plunger 47, shift ring 24, and plunger 26 move to the right. When the shift ring has reached a neutral position, or a position slightly less than neutral, the end of the piston 46 reaches the bevelled end portion 49 of the bore 48 in the member 50. The bevel 49, in cooperation with the rounded edge 51 of the piston 46, provides a bypass passage for the pressure fluid standing in the bore 48 and acting on the piston 46. By properly adjusting the position of the plug 50 in the cylinder 38, the control device will bring the pump exactly to neutral, or to such stroke as will exactly make up slippage and leakage in the hydraulic system and will cause the pump to dwell in that position under pressure and without hunting or wobbling. Any tendency for the pump to hunt is opposed by the action of the bevel 49 in restricting or enlarging the bypass passage.

In Figure 2, the pump is shown connected for low pressure operation. In this figure, the port 70 is connected by a conduit 80 with the discharge side of the pump while the port 60 is connected by the conduit 82 with the reservoir 14. At this time, the port 74 is plugged and the port 68 may be plugged or unplugged as desired. The reduced pressure at which the pump operates is determined by the differential area of the piston 44 and the action of the bevel 49 and the end of the piston 46 is identical with that explained in connection with high pressure operation.

It will be apparent that the bevel could be formed on the piston 46 rather than the end of the plug 50 if desired. This is illustrated in Figure 5 wherein the piston 46a has a bevel 49a on the end thereof while the end of the bore 48a in the plug 50a may terminate in a sharp corner or be rounded as at 51a as is illustrated.

It has been found in the use of this invention, that the pump shifts to neutral smoothly and dwells without hunting or wobbling at the pressure for which the spring has been adjusted.

The adjustability of the plug 50 permits the device to be adjusted to different pumps having slightly different neutral positions, as well as permitting the neutral position of the pump to be somewhat adjusted in order to compensate for slippage in the system being fed and the bypassing of fluid through the control device.

In order better to illustrate the operation of the present invention the action of the pump is diagrammatically illustrated in Figure 6. It will be understood that the graph in Figure 6 is only illustrative and that the particular shapes of the curves on the graph will vary considerably with the type of circuit in which the pump is connected and the details of the bypass port.

In Figure 6 it will be seen that the rate of shifting of the pump toward neutral by the control device is at a rapid rate until the piston 46 commences to open the bypass channel formed by the bevel 49 on the end of the plug 50. Thereafter, the rate of shifting the pump decreases rapidly until, at or near zero delivery, the rate of shifting is also zero.

While it may be assumed that the piston 46 ordinarily fits quite closely within the bore of the plug 50, this is not necessarily so and there may be some slight leakage of fluid past the said piston without interfering with the operation of this invention. In the graph, this possibility is taken into account in the curve which indicates the rate of bypassing fluid. The rate of bypassing curve commences at a predetermined bypassing rate and rises slowly as the piston 46 moves rightwardly in the cylinder 50 to the point where the bypass port begins to be effective. Thereafter, the rate of bypassing fluid, which is indicated as a percentage of the fluid supplied to the control device, rapidly approaches one hundred per cent. It will be evident from this graph that the operation of this control device is exceedingly stable and that any tendency for the movable flow control member of the pump to hunt or oscillate about its rest position will be opposed by restoring forces which are proportional to the severity of the said hunting or oscillations.

It will be understood that this invention is susceptible to modification in order to adapt it to different usages and conditions and, accordingly, it is desired to comprehend such modifications within this invention as may fall within the scope of the appended claims.

I claim:

1. In a variable delivery hydraulic pump having a pressure outlet; a flow control member movable within said pump between neutral and full delivery positions; yieldable means engaging said flow control member and constantly urging the latter to its full delivery position; a casing connected with said pump and provided internally with a pair of adjoining chambers of different diameters, and having a first port communicating with one of said pair of chambers and a second port communicating with the other of said chambers; a piston member slidably carried in said casing and having an end portion thereof engaged with said flow-controlling member, an intermediate portion closely fitting the walls of one of the chambers of said casing and a relatively reduced diameter opposite end portion extending within the other chamber of said casing, the said opposite end portion of said piston member having a diameter closely approximating the diameter of said other chamber of said casing, said piston member being movable in said casing in response to the introduction of fluid pressure within either of the chambers of said casing to a position simultaneously establishing communication between said chambers and shifting said flow control member to its neutral position; a first conduit directly connecting the first port of said casing with the pressure outlet of said pump for supplying pressure fluid to one of the chambers of said casing; and a second conduit connected with the second port of said casing for exhausting fluid from the other chamber of said casing.

2. In combination, a variable delivery fluid pump having a pressure outlet; a flow control member in said pump movable between neutral and full delivery positions; yieldable means urging said flow control member toward its full delivery position; a cylinder connected with said pump and having a stepped chamber therein and a pair of ports communicating with the chamber at spaced intervals on each side of the stepped region thereof; a stepped piston member reciprocable in said cylinder and engaging said flow control member for shifting the latter from its full delivery position toward its neutral position in opposition to said yieldable means, said piston member being formed with an extended plunger normally arranged to interrupt communication between the ports of said cylinder, but movable with said piston member to a position providing restricted communication between the ports of said cylinder simultaneously with the movement of said flow control member to its neutral position; a first conduit directly connecting one of the ports of said cylinder with the outlet of said pump; and a second conduit connected with the other port of said cylinder for exhausting fluid therefrom.

3. In a variable delivery hydraulic pump having a pressure outlet; a flow control member movable in said pump between neutral and full delivery positions; yieldable means constantly urging said flow control member to its full delivery position; a cylinder connected with said pump and having a stepped, fluid-receiving chamber therein and a pair of ports communicating with the chamber at spaced intervals on each side of the stepped region thereof; a piston member reciprocable in the chamber of said cylinder and connected with said flow control member; a relatively reduced end member on said piston member arranged to interrupt communication between the ports of said cylinder when said flow control member occupies a position other than a substantially neutral position, and being movable to a position providing for restricted communication between the ports of said cylinder when said flow control member occupies a substantially neutral position, said piston member and said end member being operable, in response to the introduction of fluid pressure within either of the ports of said cylinder of a magnitude sufficient to overcome said yieldable means, to move said flow control member to a substantially neutral position while simultaneously establishing communication between said pair of ports; a first conduit means connecting one of said pair of ports directly with the outlet of said pump; and a second conduit means for exhausting fluid from the other of said pair of ports.

4. An automatic pressure-holding control for a variable delivery hydraulic pump having a pressure outlet, comprising a flow control member in said pump movable between full delivery and neutral positions; a cylinder mounted on said pump and formed with an axial bore and a pair of ports communicating with the bore at spaced intervals therealong; a sleeve carried in the bore of said cylinder and having a chamber therein defining a reduced diameter continuation of said bore; means in said sleeve establishing communication between one of the ports of said cylinder and the chamber of said sleeve; a stepped piston member reciprocable in the bore of said cylinder and having one end portion thereof engaged with said flow control member and its opposite end portion movable into and out of the chamber provided in said sleeve, the opposite end portion of said piston member being arranged to interrupt communication between the chamber of said sleeve and the bore of said cylinder when said flow control member occupies other than a substantially neutral position, but being movable to a position establishing communication between the bore of said cylinder and the chamber of said sleeve when said flow control member occupies a substantially neutral position, said piston member being movable, in response to the introduction of fluid pressure within either the bore of said cylinder or the chamber of said sleeve, to move said flow control member to a substantially neutral position; conduit means directly connecting one of the ports of said cylinder with the pressure outlet of said pump; other conduit means connected with the other of the ports of said cylinder for exhausting fluid therefrom; and means connected with said sleeve for varying the position thereof within the bore of said cylinder whereby to vary the extent of movement of the said opposite end portion of said piston member necessary to establish communication between the chamber of said sleeve and the bore of said cylinder.

HOWARD M. PURCELL.

REFERENCES CITED

The following references are of record in the file of this patent:

UNITED STATES PATENTS

| Number | Name | Date |
|---|---|---|
| 559,526 | Heermans | May 5, 1896 |
| 1,241,691 | White | Oct. 2, 1917 |
| 1,965,937 | Ferris | July 10, 1934 |
| 1,974,138 | Ferris et al. | Sept. 18, 1934 |
| 2,184,665 | Ernst | Dec. 26, 1939 |
| 2,229,965 | Ernst et al. | Jan. 28, 1941 |
| 2,230,054 | Ernst | Jan. 28, 1941 |
| 2,231,963 | Stratton | Feb. 18, 1941 |
| 2,238,061 | Kendrick | Apr. 15, 1941 |
| 2,251,274 | Ernst | Aug. 5, 1941 |
| 2,258,981 | Ernst | Oct. 14, 1941 |
| 2,295,780 | Ernst | Sept. 15, 1942 |
| 2,424,300 | Becker | July 22, 1947 |